United States Patent [19]

Holbrook et al.

[11] 4,137,189

[45] Jan. 30, 1979

[54] THREE COMPONENT COMMON HYDRAULIC FLUID COMPRISING A NON-LINEAR SILOXANE FLUID

[75] Inventors: George W. Holbrook, Midland; Eugene R. Jakubczak, Bay City; Charles A. Roth, Midland, all of Mich.

[73] Assignee: Dow Corning Corporation, Midland, Mich.

[21] Appl. No.: 760,776

[22] Filed: Jan. 19, 1977

[51] Int. Cl.² ............................................. C10M 3/44
[52] U.S. Cl. ................................. 252/75; 252/32.7 E; 252/33.6; 252/49.6; 252/54.6; 252/78.3
[58] Field of Search ....................... 252/78.3, 75, 78.1, 252/49.6, 54.6, 32.7 E, 33.6

[56] References Cited

U.S. PATENT DOCUMENTS

| | | | |
|---|---|---|---|
| 2,382,082 | 8/1945 | McGregor et al. | 260/448.2 R X |
| 2,398,187 | 4/1946 | McGregor et al. | 252/78.3 |
| 2,877,184 | 3/1959 | Ragborg | 252/78.3 |
| 3,428,563 | 2/1969 | Lowe | 252/32.7 E |
| 3,429,820 | 2/1969 | Lyons et al. | 252/75 X |
| 3,532,626 | 10/1970 | Rowe | 252/32.7 E |
| 3,642,626 | 2/1972 | Christian | 252/33.6 |
| 3,759,827 | 9/1973 | Groenhof et al. | 252/49.6 X |
| 3,833,505 | 9/1974 | Brown | 252/78.3 X |
| 3,948,789 | 4/1976 | Brooks | 252/78.3 X |
| 3,977,986 | 8/1976 | Conte et al. | 252/78.3 |

*Primary Examiner*—Harris A. Pitlick
*Attorney, Agent, or Firm*—Jack E. Moermond

[57] ABSTRACT

A composition is disclosed which consists essentially of (A) select siloxane fluids, (B) select chlorendates and (C) select metal phosphorodithioates or dithiocarbamates. These compositions are useful as hydraulic fluids in power steering, power brake and other systems requiring the transmission of power from one place to another via a fluid medium.

26 Claims, No Drawings

THREE COMPONENT COMMON HYDRAULIC FLUID COMPRISING A NON-LINEAR SILOXANE FLUID

The use of various fluids including siloxane fluids for the transmission of power is a well known phenomena. At the outset the transmission of power per se was the chief concern. The increasing complexity of the mechanical systems involved other factors, such as the lubricating characteristics of the fluid, became of equal concern. Now the search has turned to looking for a "common fluid", that is a single fluid composition which can be utilized in all fluid power transmission systems of a mechanical device such as the automobile. Such a common fluid would eventually enable automobile manufacturers, for example, to install a single reservoir for all hydraulic fluid devices on a given automobile thereby reducing the overall weight of the automobile and reducing possibilities of contamination of any particular hydraulic fluid system.

One such common fluid has been recently developed. This fluid consists essentially of a trimethylsilyl endblocked polydimethylsiloxane to which a chlorendate and an antimony or lead compound has been added. This fluid is the subject of U.S. patent application Ser. No. 639,500, filed Dec. 10, 1975 by Holbrook and Page and is entitled "Common Hydraulic Fluid." This common fluid performs very well but does not have a cloud point which is consistently low enough. It has been discovered in accordance with the instant invention that if a siloxane fluid as hereinafter defined is employed in place of the fluid in the Holbrook and Page application, not only does the common fluid perform well but it also has a consistently lower cloud point.

It is an object of this invention to provide a composition useful as a hydraulic fluid.

Another object is to provide a composition useful as a common fluid in all the fluid power transmission systems of a mechanical device.

Still another object is to provide a composition which will not only be useful as a hydraulic fluid but which will also provide the requisite lubrication to the device in which it is employed.

It is particularly an object of this invention to provide a hydraulic fluid useful in both the power steering and power brake systems of vehicles.

Another object of this invention is to provide a hydraulic fluid, particularly useful in both the power steering and power brake systems of vehicles, which has a consistently lower cloud point than heretofore available common fluids.

More specifically, this invention relates to a composition consisting essentially of (A) 89.5 to 94.75 percent by weight of a siloxane fluid having a viscosity of less than 10,000 centistokes at 25° C., said siloxane fluid being composed of R'SiO$_{3/2}$ units wherein R' is selected from the group consisting of methyl, ethyl, propyl, butyl, octyl, 3-chloropropyl and 3,3,3-trifluoropropyl radicals, R''$_2$SiO units and R''$_3$SiO$_{1/2}$ units wherein at least 95 percent of the R'' radicals are methyl radicals, there being from 1 to 10 mole percent of the R'SiO$_{3/2}$ units in the siloxane fluid, and the mole ratio of the R'SiO$_{3/2}$ units to the R''$_3$SiO$_{1/2}$ units in the siloxane fluid being less than 1.2, (B) 5 to 10 percent by weight of a chlorendate having the general formula

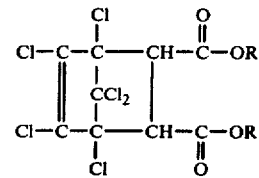

wherein each R is an alkyl radical containing from 4 to 10 carbon atoms or the tetrahydrofurfural radical, and (C) 0.25 to 0.5 percent by weight of a compound selected from the group consisting of antimony dithiocarbamates, antimony phosphorodithioates, lead dithiocarbamates and lead phosphorodithioates.

This invention also relates to an improvement in a process of transmitting power from one place to another via a hydraulic fluid medium, said improvement comprising using as the hydraulic fluid medium a composition consisting essentially of (A) 89.5 to 94.75 percent by weight of a siloxane fluid having a viscosity of less than 10,000 centistokes at 25° C., said siloxane fluid being composed of R'SiO$_{3/2}$ units wherein R' is selected from the group consisting of methyl, ethyl, propyl, butyl, octyl, 3-chloropropyl and 3,3,3-trifluoropropyl radicals, R''$_2$SiO units and R''$_3$SiO$_{1/2}$ units wherein at least 95 percent of the R'' radicals are methyl radicals, there being from 1 to 10 mole percent of the R'SiO$_{3/2}$ units in the siloxane fluid, and the mole ratio of the R'SiO$_{3/2}$ units to the R''$_3$SiO$_{1/2}$ units in the siloxane fluid being less than 1.2, (B) 5 to 10 percent by weight of a chlorendate having the general formula

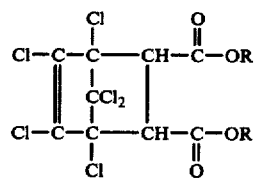

wherein each R is an alkyl radical containing from 4 to 10 carbon atoms or the tetrahydrofurfural radical, and (C) 0.25 to 0.5 percent by weight of a compound selected from the group consisting of antimony dithiocarbamates, antimony phosphorodithioates, lead dithiocarbamates and lead phosphorodithioates.

Ingredient (A) of the composition of this invention is a siloxane fluid having a viscosity of less than 10,000 centistokes at 25° C. The siloxane fluids useful in the composition of this invention are composed of R'SiO$_{3/2}$, R''$_2$SiO and R''$_3$SiO$_{1/2}$ units.

The R' radical can be a methyl, ethyl, propyl, butyl, octyl, 3-chloropropyl or a 3,3,3-trifluoropropyl radical.

At least 95 percent of the R'' radicals must be methyl radicals, and preferably all the R'' radicals are methyl radicals. However, up to 5 percent of the R'' radicals can be hydrocarbon or substituted hydrocarbon radicals other than the methyl radical. If other such radicals are present in the siloxane fluid they are preferably hydrocarbon or halogenated hydrocarbon radicals containing from 1 to 6 carbon atoms.

In the siloxane fluids employed herein there must be from 1 to 10 mole percent of the R'SiO$_{3/2}$ units, and the ratio of the R'SiO$_{3/2}$ units to the R''$_3$SiO$_{1/2}$ units must be less than 1.2.

It should be understood that mixtures of two or more of the above defined siloxane fluids can be used in the compositions of this invention. Also, the viscosity limitation is that of the final fluid whether it be a single siloxane or a mixture. When more than one siloxane fluid is used some of them may have viscosities greater than 10,000 centistokes as long as the viscosity of the resulting mixture does not exceed this limit.

It is believed at this time that the siloxane fluids useful herein must be prepared by base catalysis and equilibration according to techniques known to those skilled in the art.

Ingredient (B) of the composition of this invention is a chlorendate having the general formula

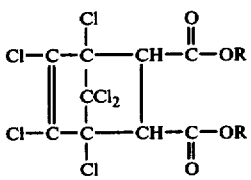

wherein each R is an alkyl radical containing from 4 to 10 carbon atoms or the tetrahydrofurfural radical. Thus R in this formula can be the butyl, tertiary butyl, pentyl, hexyl, heptyl, octyl, 2-ethylhexyl, nonyl, decyl or the

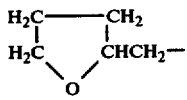

radical. Preferably R is a butyl, hexyl, octyl or 2-ethylhexyl radical.

Ingredient (C) of the composition of this invention is an antimony or lead dithiocarbamate or phosphorodithioate. More specifically this ingredient is an antimony dialkyl phosphorodithioate, an antimony dialkyl dithiocarbamate, a lead dialkyl phosphorodithioate or a lead dialkyl dithiocarbamate. Such compounds have the general formula

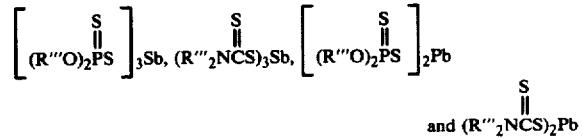

wherein each R''' is an alkyl radical which preferably contains from 4 to 10 carbon atoms. Specific examples of the R''' radical include the butyl, tertiary butyl, hexyl, octyl, 2-ethylhexyl and decyl radicals with the butyl, octyl and 2-ethylhexyl radicals being preferred.

The compositions of this invention are prepared by simply adding ingredients (B) and (C) to siloxane fluid (A) and thoroughly mixing them in. The proportions of the ingredients should be as specified above. It is also desirable for best results to select components (B) and (C) such that they remain soluble in siloxane fluid (A) over the entire temperature range of the anticipated use, for example −40° F. to 250° F. in automobiles. The solubility can be controlled to some extent by the alkyl groups present in the three ingredients.

So far as is known at this time, no specially designed equipment or systems are required for the use of the compositions of this invention as hydraulic fluids. That is, the compositions of this invention can be used in conventional power steering, power brake or other hydraulic systems now in commercial use. However, with the feasibility of these compositions to be used as "common fluids," it is anticipated that new central hydraulic systems will be designed.

Now in order that those skilled in the art may better understand how the present invention can be practiced, the following examples are given by way of illustration and not by way of limitation. All parts and percents referred to herein are by weight and all viscosities measured at 25° C. unless otherwise specified.

The following is a description of the tests referred to in the examples below.

4-Ball Test

The Roxana 4-Ball Lubrication Tester was used with standard ½ inch AISI-E-52100 chrome-alloy steel balls which had been ultrasonically cleaned with toluene and acetone and air dried before use. Other parts are rinsed with toluene and acetone and air dried before use. The average scar diameter of six readings is reported in millimeters. These test results are reproducible to ±10%.

Cloud Point Temperature

This test attempts to measure the degree of compatibility (i.e., mutual solubility) of the components of the composition. This is done by determining the temperature at which phase separation occurs. This is defined as the point where a ½ inch tube containing the sample appears opaque. The tubes containing the samples are positioned in a stirred bath of isopropyl alcohol and the temperature lowered at the rate of ½° C./minute using dry ice as the coolant. These test results are reproducible at ±3° C.

EXAMPLE 1

To a 5 liter, 3-necked glass flask equipped with a condenser, Dean Stark trap, stirrer, thermometer and water addition apparatus there was added 596.25 g. chloropropyltrimethoxysilane, 733.50 g. polydimethylsiloxane cyclics, 170.25 g. hexamethyldisiloxane, 375 ml. heptane and 1.5 g. trifluoromethane sulfonic acid. This charge was calculated to yield an intermediate copolymer composed of 20 mole percent $ClCH_2CH_2CH_2SiO_{3/2}$ units, 66 mole percent $(CH_3)_2SiO$ units and 14 mole percent $(CH_3)_3SiO_{1/2}$ units. The above charge was heated to 70° C. with 100 g. of water being added dropwise such that the evolution of methanol could be controlled. (An amount of water equal to or greater than the stoichiometric amount needed to remove the methoxy groups should be used.) The methanol, heptane and siloxane distillate was collected and washed with water, and then the heptane-siloxane layer separated and returned to the reaction vessel. After addition of the stoichiometric amount of water was completed, the temperature of the flask was allowed to reach heptane reflux conditions (about 110° C.) with no more methanol-water azeotrope evolving. Three additional aliquots of approximately 20 percent stoichiometric water were added dropwise with heptane reflux temperature being reached between aliquots. The flask was allowed to cool below 60° C. at which point a factor of 10 percent excess sodium carbonate was added to neutralize the trifluoromethane sulfonic acid catalyst. The material was then filtered and stripped to 130° C. and 5 mm. mercury pressure. The resulting intermediate had SiOH and SiOCH₃ levels of less than 200 ppm. 56.68 g. of the above intermediate, 94.43 g. of polydimethylsiloxane cyclics, 149.03 g. of a trimethylsilyl endblocked polydimethylsiloxane having a viscosity of about 2 cs., and about 0.075 ±0.025 percent, based on the weight of the siloxane, of trifluoromethane sulfonic acid catalyst were added to a reaction vessel equipped with stirrer, condenser and thermometer.

All reactants were free of water and low in silanol content. The reaction mixture was heated to 90° C. for 1 hour, then cooled to room temperature (25° C.) and agitated at that temperature for 24 hours to a steady state viscosity. The catalyst was then neutralized with an excess of sodium carbonate and filtered. The resulting fluid was then stripped to 225° C. holding one hour at 1 mm. mercury absolute pressure with a nitrogen purge in a flask equipped with a short vigreux column to remove 34 percent volatiles. The resulting siloxane fluid had a viscosity of about 26 cs., was composed of about 4.5 mole percent $ClCH_2CH_2CH_2SiO_{3/2}$ units, about 79.5 mole percent $(CH_3)_2SiO$ units and about 16 mole percent $(CH_3)_3SiO_{1/2}$ units, and has a mole ratio of chloropropylsilsesquioxane units to trimethylsiloxy units of about 0.28.

EXAMPLE 2

To a 5 liter pot equipped with a stirrer, condenser, thermometer and an addition funnel there was added 1470 ml. of water. A mixture of 780 g. (653 ml.) of propyltrichlorosilane, 1982 g. (1847 ml.) of dimethyldichlorosilane and 238 g. (278 ml.) of trimethylchlorosilane was placed in the addition funnel. Ice was packed around the pot to keep the temperature from rising appreciably and then the chlorosilane mixture was added dropwise to the water with agitation. After the addition of the chlorosilanes was complete, the siloxane hydrolyzate separated from the aqueous HCl solution. (Generally speaking it is preferred to add heptane to the reaction mixture to obtain a 60 percent heptane-40 percent siloxane mixture in order to achieve better separation of the siloxane.) The aqueous HCl layer was drained off, the siloxane layer washed several times with distilled water, then the siloxane layer was stripped at 115° C. for 1.5 hours at 1 mm. of mercury pressure, and finally the resulting product was filtered.

To a 500 ml. pot equipped with a condenser, trap, stirrer and thermometer there was added 85.12 g. of the above prepared hydrolyzate, 163.16 g. of polydimethylsiloxane cyclics, 151.72 g. of trimethylsilyl endblocked polydimethylsiloxane having a viscosity of about 2 cs., and 1.2 g. of tetrabutylphosphonium silanolate catalyst (neutral equivalent = 2100). The trap was filled with a portion of the reaction mixture before the catalyst was added. The mixture was heated to 115° C. at 60 mm. mercury pressure and held there for 30 minutes with cyclic reflux to remove water. Then the trap material was dried and returned to the pot. The trap was then replaced with a straight condenser, and heating continued as above at 115° C. for another 1.5 hours. The temperature was then raised to 160° C. at atmospheric pressure and held there for one hour, followed by stripping at 225° C. and 1 mm. mercury pressure using a vigreux column and finally filtering. The resulting siloxane fluid had a viscosity of about 30 cs., was composed of about 4.5 mole percent $CH_3CH_2CH_2SiO_{3/2}$ units, about 78.5 mole percent $(CH_3)_2SiO$ units and about 17 mole percent $(CH_3)_3SiO_{1/2}$ units, and has a mole ratio of propylsilsesquioxane units to trimethylsiloxy units of about 0.26.

EXAMPLE 3

To a 500 ml. three-necked flask equipped with a stirrer, thermometer, Dean Stark trap and condenser there was added 159.2 g. of a hydrolyzate composed of about 9.6 weight percent monomethylsilsesquioxane units, about 87.2 weight percent dimethylsiloxane units and about 3.2 weight percent trimethylsiloxy units, 39.5 g. of trifluoropropylmethylcyclotrisiloxane, 43.3 g. of polydimethylsiloxane cyclics, and 158.1 g. of a trimethylsilyl endblocked polydimethylsiloxane having a viscosity of about 2 cs., a portion of this mixture being used to fill the trap. Tetrabutylphosphonium silanolate catalyst (1 P atom per 10,000 Si atoms) was added to the flask and the reaction mixture to 115° C. at 60 mm. mercury pressure and held there for 30 minutes with cyclic reflux to remove water. The material in the trap was then dried and put into the flask, and then heating continued as above at 115° C. for another 1.5 hours. The temperature was then raised to 160° C. at atmospheric pressure and held there for one hour, followed by stripping to 225° C. and 1 mm. mercury pressure using a vigreux column for 1.5 hours, and finally filtering. The resulting siloxane fluid had a viscosity of about 21.5 cs., was composed of about 4.5 mole percent $CH_3SiO_{3/2}$ units, about 73 mole percent $(CH_3)_2SiO$ units, about 5 mole percent $(CF_3CH_2CH_2)(CH_3)SiO$ units and about 17.5 mole percent $(CH_3)_3SiO_{1/2}$ units, and has a mole ratio of methylsilsesquioxane units to trimethylsiloxy units of about 0.26.

EXAMPLE 4

To a 5 liter, three-necked flask equipped with a Dean Stark trap, condenser, stirrer, thermometer and addition funnel there was added 742 g. of methyltrimethoxysilane, 2000 g. of polydimethylsiloxane cyclics, 315 g. of hexamethyldisiloxane, 785 g. of heptane and 3.14 g. of trifluoromethane sulfonic acid catalyst. These components were heated to 70° C. and then 151 ml. of water were added dropwise from the funnel, the addition rate being such that the pot temperature was maintained below 85° C. Volatiles came off as one phase initially but subsequently formed two phases, the top phase being returned to the pot. When the addition of the first aliquot of water was completed the temperature was raised to 90° C. and another 151 ml. of water was added dropwise. When this addition of water was completed the temperature was raised to reflux (about 115° C.) and held there for about 30 minutes during which time the water was removed from the system. Then about 20 ml. of water was added while maintaining the temperature at 115° C. until this water was removed from the system. Two more aliquots of about 20 ml. of water were added in the same manner. When all water was removed from the system, 30 g. of sodium carbonate was added to neutralize the catalyst. The product was then stripped to about 140° C. at about 5 mm. of mercury pressure and then filtered through Supercel. The resulting product consisted essentially of about 22.2 mole percent $CH_3SiO_{3/2}$ units, about 65.5 mole percent $(CH_3)_2SiO$ units and about 12.3 mole percent $(CH_3)_3SiO_{1/2}$ units.

The above prepared hydrolyzate was then reacted with polydimethylsiloxane cyclics and a 2 cs. trimethylsilyl endblocked polydimethylsiloxane fluid employing a tetrabutylphosphonium silanolate catalyst (1 P/10,000

Si) following the procedure of Example 3 to obtain a siloxane fluid having a viscosity of about 22 cs., which consisted essentially of about 9 mole percent $CH_3SiO_{3/2}$ units, about 69 mole percent $(CH_3)_2SiO$ units and about 22 mole percent $(CH_3)_3SiO_{1/2}$ units, and which had a mole ratio of methylsilsesquioxane units to trimethylsiloxy units of about 0.41.

EXAMPLE 5

An intermediate hydrolyzate composed of about 23 mole percent $CH_3SiO_{3/2}$ units, about 65.3 mole percent $(CH_3)_2SiO$ units and about 11.5 mole percent $(CH_3)_3SiO_{1/2}$ units was prepared as in Example 4 and then reacted with polydimethylsiloxane cyclics and a 2 cs. trimethylsilyl endblocked polydimethylsiloxane fluid employing a tetrabutylphosphonium silanolate catalyst (1 P/10,000 Si) following the procedure of Example 3 to obtain a siloxane fluid having a viscosity of about 20 cs., which consisted essentially of about 4.5 mole percent $CH_3SiO_{3/2}$ units, about 78.5 mole percent $(CH_3)_2SiO$ units and about 17 mole percent $(CH_3)_3SiO_{1/2}$ units, and which had a mole ratio of methylsilsesquioxane units to trimethylsiloxy units of about 0.26.

EXAMPLE 6

Several compositions were prepared for testing in the 4-Ball Test.

Composition I consisted essentially of 100% of the 3-chloropropylsilsesquioxane containing fluid of Example 1.

Composition II consisted essentially of 92.3% of the 3-chloropropylsilsesquioxane containing fluid of Example 1, 7.2% of di-2-ethylhexyl chlorendate, and 0.5% of antimony di-2-ethylhexyl dithiocarbamate.

Composition III consisted essentially of 92.3% of the propylsilsesquioxane containing fluid of Example 2, 7.2% of di-2-ethylhexyl chlorendate, and 0.5% of antimony di-2-ethylhexyl dithiocarbamate.

Composition IV consisted essentially of 92.3% of the methylsilsesquioxane containing fluid of Example 4, 7.2% of di-2-ethylhexyl chlorendate, and 0.5% of antimony di-2-ethylhexyl dithiocarbamate.

Composition V consisted essentially of 92.3% of the methylsilsesquioxane containing fluid of Example 5, 7.2% of di-2-ethylhexyl chlorendate, and 0.5% of antimony di-2-ethylhexyl dithiocarbamate.

Composition VI consisted essentially of 92.3% of the methylsilsesquioxane containing fluid of Example 3, 7.2% of di-2-ethylhexyl chlorendate, and 0.5% of antimony di-2-ethylhexyl dithiocarbamate.

The 4-Ball Test was run at 250° F., at 3300 rpm, for one hour, with a 25 kg. load. Test results are set forth in the following table.

| Composition | 4-Ball scar (mm) |
|---|---|
| I* | 2.50 |
| II | 0.87 |
| III | 0.87 |
| IV | 1.04 |
| V | 0.844 |
| VI | 0.968 |

*Included for comparison--terminated after 5 minutes.

EXAMPLE 7

Four compositions were prepared for evaluation in the 4-Ball and Cloud Point Tests.

Composition I consisted essentially of 93.6 percent of a trimethylsilyl endblocked polydimethylsiloxane fluid having a viscosity of 50 cs., 6 percent of dibutylchlorendate, and 0.4 percent of antimony dibutyl phosphorodithioate (Van Lube 622).

Composition II consisted essentially of 93.5 percent of a siloxane composed of about 7.5 mole percent $ClCH_2CH_2CH_2SiO_{3/2}$ units, about 74.8 mole percent $(CH_3)_2SiO$ units and about 17.7 mole percent $(CH_3)_3SiO_{1/2}$ units, 6 percent of dibutylchlorendate, and 0.5 percent of antimony di-2-ethylhexyl dithiocarbamate.

Composition III consisted essentially of 92.3 percent of a trimethylsilyl endblocked polydimethylsiloxane fluid having a viscosity of 50 cs., 7.2 percent of di-2-ethylhexyl chlorendate, and 0.5 percent of antimony di-2-ethylhexyl dithiocarbamate.

Composition IV consisted essentially of 92.3 percent of a siloxane composed of about 7.5 mole percent $ClCH_2CH_2CH_2SiO_{3/2}$ units, about 74.8 mole percent $(CH_3)_2SiO$ units and about 17.7 mole percent $(CH_3)_3SiO_{1/2}$ units, 7.2 percent of di-2-ethylhexyl chlorendate, and 0.5 percent of antimony di-2-ethylhexyl dithiocarbamate.

The 4-Ball Test was run at 250° F., at 3300 rpm, for one hour, with a 25 kg. load. The Cloud Point test was run as described above. The test results are set forth in the table below.

| Composition | 4-Ball scar (mm) | Cloud Point (° C) |
|---|---|---|
| I* | 1.0 | 0° |
| II | 0.85 | −40° to −55° |
| III* | 1.1 | −5° to −15° |
| IV | 0.90 | < −75° |

*Included for purposes of comparison.

EXAMPLE 8

Three compositions were prepared for evaluation in the 4-Ball and Cloud Point Tests.

Composition I consisted essentially of 92.3 percent of a trimethylsilyl endblocked polydimethylsiloxane fluid having a viscosity of 50 cs., 7.2 percent of di-2-ethylhexyl chlorendate, and 0.5 percent of antimony di-2-ethylhexyl dithiocarbamate.

Composition II consisted essentially of 92.3 percent of a siloxane fluid composed of about 4.5 mole percent $CH_3SiO_{3/2}$ units, about 78.5 mole percent $(CH_3)_2SiO$ units and about 17 mole percent $(CH_3)_3SiO_{1/2}$ units, 7.2 percent of di-2-ethylhexyl chlorendate, and 0.5 percent of antimony di-2-ethylhexyl dithiocarbamate.

Composition III consisted essentially of 92.3 percent of a siloxane fluid composed of about 4.5 mole percent $ClCH_2CH_2CH_2SiO_{3/2}$ units, about 79.5 mole percent $(CH_3)_2SiO$ units and about 16 mole percent $(CH_3)_3SiO_{1/2}$ units, 7.2 percent of di-2-ethylhexyl chlorendate, and 0.5 percent of antimony di-2-ethylhexyl dithiocarbamate.

The 4-Ball Test was run at 250° F., at 3300 rpm, for one hour, with a 25 kg. load. The Cloud Point Test was run as described above. The test results are set forth in the table below.

| Composition | 4-Ball scar (mm) | Cloud Point (° C) |
|---|---|---|
| I* | 0.95 – 1.35 | −4° to −10° |
| II | 0.97 | −1° to −5° |
| III | 0.87 – 1.07 | −77° |

*Included for purposes of comparison.

That which is claimed is:

1. A composition consisting essentially of
   (A) 89.5 to 94.75 percent by weight of a siloxane fluid having a viscosity of less than 10,000 centistokes at 25° C., said siloxane fluid being composed of R'SiO$_{3/2}$ units wherein R' is selected from the group consisting of methyl, ethyl, propyl, butyl, octyl, 3-chloropropyl and 3,3,3-trifluoropropyl radicals, R"$_2$SiO units and R"$_3$SiO$_{1/2}$ units wherein at least 95 percent of the R" radicals are methyl radicals, there being from 1 to 10 mole percent of the R'SiO$_{3/2}$ units in the siloxane fluid, and the mole ratio of the R'SiO$_{3/2}$ units to the R"$_3$SiO$_{1/2}$ units in the siloxane fluid being less than 1.2,
   (B) 5 to 10 percent by weight of a chlorendate having the general formula

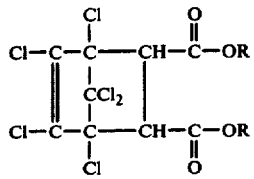

wherein each R is an alkyl radical containing from 4 to 10 carbon atoms or the tetrahydrofurfural radical, and p1 (C) 0.25 to 0.5 percent by weight of a compound selected from the group consisting of antimony dithiocarbamates, antimony phosphorodithioates, lead dithiocarbamates and lead phosphorodithioates.

2. A composition as defined in claim 1 wherein in siloxane fluid (A) R' is a methyl radical, all R" radicals are methyl radicals, and the siloxane fluid has a viscosity of less than 1000 centistokes, chlorendate (B) contains from 4 to 8 carbon atoms, and (C) is an antimony dithiocarbamate or an antimony phosphorodithioate.

3. A composition as defined in claim 2 wherein siloxane fluid (A) has a viscosity of less than 100 centistokes, in chlorendate (B) R contains 8 carbon atoms, and (C) is an antimony phosphorodithioate.

4. A composition as defined in claim 2 wherein siloxane fluid (A) has a viscosity of less than 100 centistokes, in chlorendate (B) R contains 8 carbon atoms, and (C) is an antimony dithiocarbamate.

5. A composition as defined in claim 1 wherein in siloxane fluid (A) R' is a propyl radical, all R" radicals are methyl radicals, and the siloxane fluid has a viscosity of less than 1000 centistokes, chlorendate (B) contains from 4 to 8 carbon atoms, and (C) is an antimony dithiocarbamate or an antimony phosphorodithioate.

6. A composition as defined in claim 5 wherein siloxane fluid (A) has a viscosity of less than 100 centistokes, in chlorendate (B) R contains 8 carbon atoms, and (C) is an antimony phosphorodithioate.

7. A composition as defined in claim 5 wherein siloxane fluid (A) has a viscosity of less than 100 centistokes, in chlorendate (B) R contains 8 carbon atoms, and (C) is an antimony dithiocarbamate.

8. A composition as defined in claim 1 wherein in siloxane fluid (A) R' is a 2-ethylhexyl radical, all R" radicals are methyl radicals, and the siloxane fluid has a viscosity of less than 1000 centistokes, chlorendate (B) contains from 4 to 8 carbon atoms, and (C) is an antimony dithiocarbamate or an antimony phosphorodithioate.

9. A composition as defined in claim 8 wherein siloxane fluid (A) has a viscosity of less than 100 centistokes, in chlorendate (B) R contains 8 carbon atoms, and (C) is an antimony phosphorodithioate.

10. A composition as defined in claim 8 wherein siloxane fluid (A) has a viscosity of less than 100 centistokes, in chlorendate (B) R contains 8 carbon atoms, and (C) is an antimony dithiocarbamate.

11. A composition as defined in claim 1 wherein in siloxane fluid (A) R' is a 3-chloropropyl radical, all R" radicals are methyl radicals, and the siloxane fluid has a viscosity of less than 1000 centistokes, chlorendate (B) contains from 4 to 8 carbon atoms, and (C) is an antimony dithiocarbamate or an antimony phosphorodithioate.

12. A composition as defined in claim 11 wherein siloxane fluid (A) has a viscosity of less than 100 centistokes, in chlorendate (B) R contains 8 carbon atoms, and (C) is an antimony phosphorodithioate.

13. A composition as defined in claim 11 wherein siloxane fluid (A) has a viscosity of less than 100 centistokes, in chlorendate (B) R contains 8 carbon atoms, and (C) is an antimony dithiocarbamate.

14. A composition as defined in claim 1 wherein in siloxane fluid (A) R' is a 3,3,3-trifluoropropyl radical, all R" radicals are methyl radicals, and the siloxane fluid has a viscosity of less than 1000 centistokes, chlorendate (B) contains from 4 to 8 carbon atoms, and (C) is an antimony dithiocarbamate or an antimony phosphorodithioate.

15. A composition as defined in claim 14 wherein siloxane fluid (A) has a viscosity of less than 100 centistokes, in chlorendate (B) R contains 8 carbon atoms, and (C) is an antimony phosphorodithioate.

16. A composition as defined in claim 14 wherein siloxane fluid (A) has a viscosity of less than 100 centistokes, in chlorendate (B) R contains 8 carbon atoms, and (C) is an antimony dithiocarbamate.

17. In a process of transmitting power from one place to another via a hydraulic fluid medium, the improvement which comprises using as the hydraulic fluid medium a composition consisting essentially of
   (A) 89.5 to 94.75 percent by weight of a siloxane fluid having a viscosity of less than 10,000 centistokes at 25° C., said siloxane fluid being composed of R'SiO$_{3/2}$ units wherein R' is selected from the group consisting of methyl, ethyl, propyl, butyl, octyl, 3-chloropropyl and 3,3,3-trifluoropropyl radicals, R"$_2$SiO units and R"$_3$SiO$_{1/2}$ units wherein at least 95 percent of the R" radicals are methyl radicals, there being from 1 to 10 mole percent of the R'SiO$_{3/2}$ units in the siloxane fluid, and the mole ratio of the R'SiO$_{3/2}$ units to the R"$_3$SiO$_{1/2}$ units in the siloxane fluid being less than 1.2,
   (B) 5 to 10 percent by weight of a chlorendate having the general formula

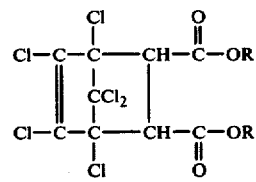

wherein each R is an alkyl radical containing from 4 to 10 carbon atoms or the tetrahydrofurfural radical, and
   (C) 0.25 to 0.5 percent by weight of a compound selected from the group consisting of antimony dithiocarbamates, antimony phosphorodithioates, lead dithiocarbamates and lead phosphorodithioates.

18. The process of claim 17 wherein in the composition siloxane fluid (A) R' is a methyl radical, all R" radicals are methyl radicals, and the siloxane fluid has a viscosity of less than 1000 centistokes, chlorendate (B) contains from 4 to 8 carbon atoms, and (C) is an antimony dithiocarbamate or an antimony phosphorodithioate.

19. The process of claim 17 wherein in the composition in siloxane fluid (A) R' is a propyl radical, all R" radicals are methyl radicals, and the siloxane fluid has a viscosity of less than 1000 centistokes, chlorendate (B) contains from 4 to 8 carbon atoms, and (C) is an antimony dithiocarbamate or an antimony phosphorodithioate.

20. The process of claim 17 wherein in the composition in siloxane fluid (A) R' is a 2-ethylhexyl radical, all R" radicals are methyl radicals, and the siloxane fluid has a viscosity of less than 1000 centistokes, chlorendate (B) contains from 4 to 8 carbon atoms, and (C) is an antimony dithiocarbamate or an antimony phosphorodithioate.

21. The process of claim 17 wherein in the composition in siloxane fluid (A) R' is a 3,3,3-trifluoropropyl radical, all R" radicals are methyl radicals, and the siloxane fluid has a viscosity of less than 1000 centistokes, chlorendate (B) contains from 4 to 8 carbon atoms, and (C) is an antimony dithiocarbamate or an antimony phosphorodithioate.

22. The process of claim 17 wherein in the composition in siloxane fluid (A) R' is a 3-chloropropyl radical, all R" radicals are methyl radicals, and the siloxane fluid has a viscosity of less than 1000 centistokes, chlorendate (B) contains from 4 to 8 carbon atoms, and (C) is an antimony dithiocarbamate or an antimony phosphorodithioate.

23. The process of claim 22 wherein in the composition siloxane fluid (A) has a viscosity of less than 100 centistokes, in chlorendate (B) R contains 8 carbon atoms, and (C) is an antimony phosphorodithioate.

24. The process of claim 22 wherein in the composition siloxane fluid (A) has a viscosity of less than 100 centistokes, in chlorendate (B) R contains 8 carbon atoms, and (C) is an antimony dithiocarbamate.

25. The process of claim 17 wherein the hydraulic fluid medium is in the power steering system of a vehicle.

26. The process of claim 17 wherein the hydraulic fluid medium is in the brake system of a vehicle.

* * * * *